United States Patent
Gotou

(10) Patent No.: US 8,801,261 B2
(45) Date of Patent: Aug. 12, 2014

(54) BACKLIGHT UNIT AND LIQUID CRYSTAL DISPLAY DEVICE

(75) Inventor: Akira Gotou, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 32 days.

(21) Appl. No.: 13/704,703

(22) PCT Filed: May 10, 2011

(86) PCT No.: PCT/JP2011/060710
§ 371 (c)(1),
(2), (4) Date: Dec. 17, 2012

(87) PCT Pub. No.: WO2011/162032
PCT Pub. Date: Dec. 29, 2011

(65) Prior Publication Data
US 2013/0100702 A1 Apr. 25, 2013

(30) Foreign Application Priority Data
Jun. 24, 2010 (JP) ................................. 2010-143881

(51) Int. Cl.
*G02B 6/00* (2006.01)

(52) U.S. Cl.
CPC .................................. *G02B 6/0078* (2013.01)
USPC ........... 362/616; 362/219; 362/97.3; 362/628

(58) Field of Classification Search
USPC ......... 362/928, 919, 219, 97.3, 612, 613, 601
See application file for complete search history.

(56) References Cited

U.S. PATENT DOCUMENTS

| | | | |
|---|---|---|---|
| 7,490,963 B2 * | 2/2009 | Fang et al. | 362/330 |
| 7,616,271 B2 * | 11/2009 | Souk et al. | 349/65 |
| 7,905,617 B2 * | 3/2011 | Yun et al. | 362/97.1 |
| 8,303,153 B2 * | 11/2012 | Ikuta et al. | 362/616 |
| 8,491,174 B2 * | 7/2013 | Derichs | 362/612 |
| 2008/0030650 A1 * | 2/2008 | Kitagawa et al. | 349/65 |
| 2008/0084709 A1 * | 4/2008 | Li et al. | 362/616 |
| 2008/0252818 A1 * | 10/2008 | Wu et al. | 349/65 |
| 2012/0275192 A1 | 11/2012 | Wakamura et al. | |
| 2013/0250213 A1 | 9/2013 | Tomomasa | |

FOREIGN PATENT DOCUMENTS

| | | |
|---|---|---|
| JP | 2004-273185 A | 9/2004 |
| WO | 2011/043002 A1 | 4/2011 |
| WO | 2012/077534 A1 | 6/2012 |

OTHER PUBLICATIONS

Official Communication issued in International Patent Application No. PCT/JP2011/060710, mailed on Aug. 9, 2011.

* cited by examiner

*Primary Examiner* — Laura Tso
(74) *Attorney, Agent, or Firm* — Keating & Bennett, LLP

(57) ABSTRACT

Disclosed is a backlight unit in order to suppress an increase of time needed for manufacture and generation of operation variance, and furthermore, to suppress deterioration and unevenness of luminance of output light. A plurality of transparent light guide plates (5), which are disposed in a chassis (4) in the lateral direction, and which output light emitted from a light source (7), are provided with a fixing protruding section (51) which is to be pressed by a fixing member (6), and an outputting section (52), which outputs planar light. The outputting section (52) is provided with, when viewed from the front, an extending section (53) which extends to cover at least a part of the fixing protruding section (51).

20 Claims, 6 Drawing Sheets

BACKLIGHT UNIT AND LIQUID CRYSTAL DISPLAY DEVICE

TECHNICAL FIELD

The present invention relates to a backlight unit that supplies light to a non-light-emitting display panel such as a liquid crystal display panel and the like, and to a liquid crystal display device that includes the backlight unit.

BACKGROUND ART

A liquid crystal display device includes a liquid crystal display panel, and a backlight unit that is disposed on a rear surface of the liquid crystal display panel, wherein the liquid crystal display panel adjusts penetration ratio (penetration amount) of light from the backlight unit and displays an image on a front surface of the liquid crystal display panel.

The backlight unit is roughly classified into two kinds. One is a light guide plate type (edge-light type) that outputs light from a side of the light guide plate, and the other is a direct type in which a light source is disposed on a rear surface of a liquid crystal module. In recent years, request for thickness reduction and side reduction of the liquid crystal display device is increasing, and more and more liquid crystal display devices are employing a backlight unit of the edge-light type that is advantageous to thickness reduction compared with the direct type.

A conventional backlight unit is described with reference to drawings. FIG. 7 is a front view of the conventional backlight unit that is used for a liquid crystal display device, and FIG. 8 is a sectional view taken along a VIII-VIII line of the backlight unit shown in FIG. 7. The backlight unit 92 is a light output device that outputs planar light from a rear surface of a liquid crystal display panel (not shown), and includes: a plurality of light sources 97; a plurality of light guide plates 95 that output light from the light source 97 as the planar light to the liquid crystal display panel; and a backlight chassis 94 in which the light source 97 and the light guide plate 95 are disposed. The backlight unit 92 includes a fixing clip 96 as well that fixes the light guide plates 95 ranged and disposed in a short-edge direction to the backlight chassis 94.

The light guide plate 95 is an elongated member formed of a transparent material that transmits light, and includes: a light reception portion 950 that receives the light from the light source 97; and an output portion 952 that outputs the light received by the light reception portion 950 as the planar light. In the light guide plate 95, an end surface in a long-edge direction defines the light reception portion 950, and a surface, which is adjacent to the light reception portion 950 and faces frontward, defines the output portion 952.

The light guide plate 95 includes, on a side opposite to the output portion 952, a fixing convex portion 951 that protrudes in the short-edge direction. When ranging the light guide plates 95 in the backlight chassis 94 in the short-edge direction, the fixing convex portions 951 of adjacent light guide plates 95 are disposed near to each other. The fixing clip 96 pushes the adjacent fixing convex portions 951 and engages with the backlight chassis 94, whereby the light guide plate 95 is ranged in the short-edge direction and fixed to the backlight chassis 94.

The backlight unit 92 includes the plurality of light guide plates 95 to be able to output the light, which has a different brightness for every one of the light guide plates 95, to the liquid crystal display panel (not shown) that is an illumination target. According to this, it is possible to raise contrast of an image displayed by the liquid crystal display panel and to improve display quality of a moving image.

In the liquid crystal display device, for example, there is a case where an image such as a white image or the like, which has an even brightness in a plane, is displayed. At this time, the backlight unit 92 is required to output the planar light that has the even brightness in the plane.

However, as shown in FIG. 8, in the backlight unit 92, a large gap is formed between the output portions 952 of the adjacent light guide plates 95, and there is a case where the light from the output portion 952 does not sufficiently extend into the gap. If the light does not extend into the gap between the output portions 952, the planar light output from the backlight unit 92 declines in brightness at the gap portion, and the brightness decline leads to brightness unevenness.

To avoid this, in the invention of JP-A-2004-273185, a light guide plate and a light emitting device are fixed to each other by means of a transparent adhesive to reduce a gap between the light emitting device and the light guide plate, whereby the brightness decline (i.e., brightness unevenness) of a plane-shaped illumination device (which corresponds to the backlight unit in the present invention) is alleviated. By bonding a plurality of light guide plates to one another by means of a transparent adhesive shown in JP-A-2004-273185, it is possible to reduce the gap between the output portions and remove the brightness unevenness.

CITATION LIST

Patent Literature

PLT1: JP-A-2004-273185

SUMMARY OF INVENTION

Technical Problem

However, if the process of bonding the light guide plates to one another is introduced into a production process of the backlight unit, the time for application and setting of the adhesive is needed and the time (tact time) for producing one backlight unit becomes long. Besides, quality of the bonding working is easily influenced by skills of a worker and an environment, and unevenness easily occurs in accuracy of the finished light guide plate.

Accordingly, it is an object of the present invention to provide a backlight unit that is able to alleviate increase in the production time, occurrence of the working unevenness and is unlikely to cause the brightness unevenness of the output light, and a liquid crystal display device that uses the backlight unit.

Solution to Problem

To achieve the above object, the present invention includes: a chassis; a plurality of light guide plates that are ranged in the chassis; and a fixing member that fixes adjacent ones of the light guide plates to the chassis; wherein the light guide plate includes: an output portion that is formed on a front side and outputs planar light; and a fixing convex portion that is formed on a side opposite to the output portion, protrudes toward the adjacent light guide plates and is pushed by the fixing member; and the output portion includes an extension portion that extends to cover at least a portion of the fixing convex portion when viewed from front.

According to this structure, the extension portions of the adjacent light guide plates are disposed near to each other when the light guide plates are ranged, accordingly, a gap between the adjacent output portions becomes small. According to this, the light is easily output into the gap as well, accordingly, it is possible to alleviate brightness decline of the light output from the backlight unit at the gap portion. Besides, bonding of the light guide plate that is an optical member is unnecessary, accordingly, it is possible to provide a backlight unit that is able to reduce the time required for the production, is not influenced by the skills of the worker and the environment, and has constant quality.

In the above structure, the extension portion is formed not to come into contact with the extension portions of the adjacent light guide plates when the plurality of light guide plates are ranged in the chassis.

In the above structure, a portion of the output portion that outputs the planar light may be formed of a convex curved surface. According to this structure, the light from the output portion is output to spread, accordingly, it is also possible to output the light sufficiently into the gap between the output portions of the adjacent light guide plates. According to this, it is possible to alleviate occurrence of brightness unevenness of the light output from the backlight unit. Here, even if the portion of the output portion that outputs the planar light has a shape including a ridge line which connects two or more planes to each other and extends in a direction to intersect a ranged direction of the light guide plate, it is possible to obtain the same effect.

In the above structure, the extension portions of the adjacent light guide plates are formed to come into contact with each other when the plurality of light guide plates are ranged in the chassis.

In the above structure, in the light guide plate, optical members that diffuse light may be independently provided on the output portion.

In the above structure, the extension portion may be formed to gradually spread toward a surface from which the planar light exits. According to this structure, the light easily travels into the extension portion; because of this, it is possible to output more light into the gap between the output portions of the adjacent light guide plates. According to this, it is possible to alleviate the brightness unevenness due to the brightness decline of the light output from the backlight unit that occurs at the gap portion.

In the above structure, as a use example of the backlight unit, there is an example where the backlight unit is used to illuminate a rear surface of a liquid crystal display device.

Advantageous Effects of Invention

According to the present invention, it is possible to provide a backlight unit that is able to alleviate increase in the production time, occurrence of the working unevenness and is unlikely to cause the brightness decline and brightness unevenness of the output light, and a liquid crystal display device that uses the backlight unit.

DESCRIPTION OF EMBODIMENTS

Figure 1:
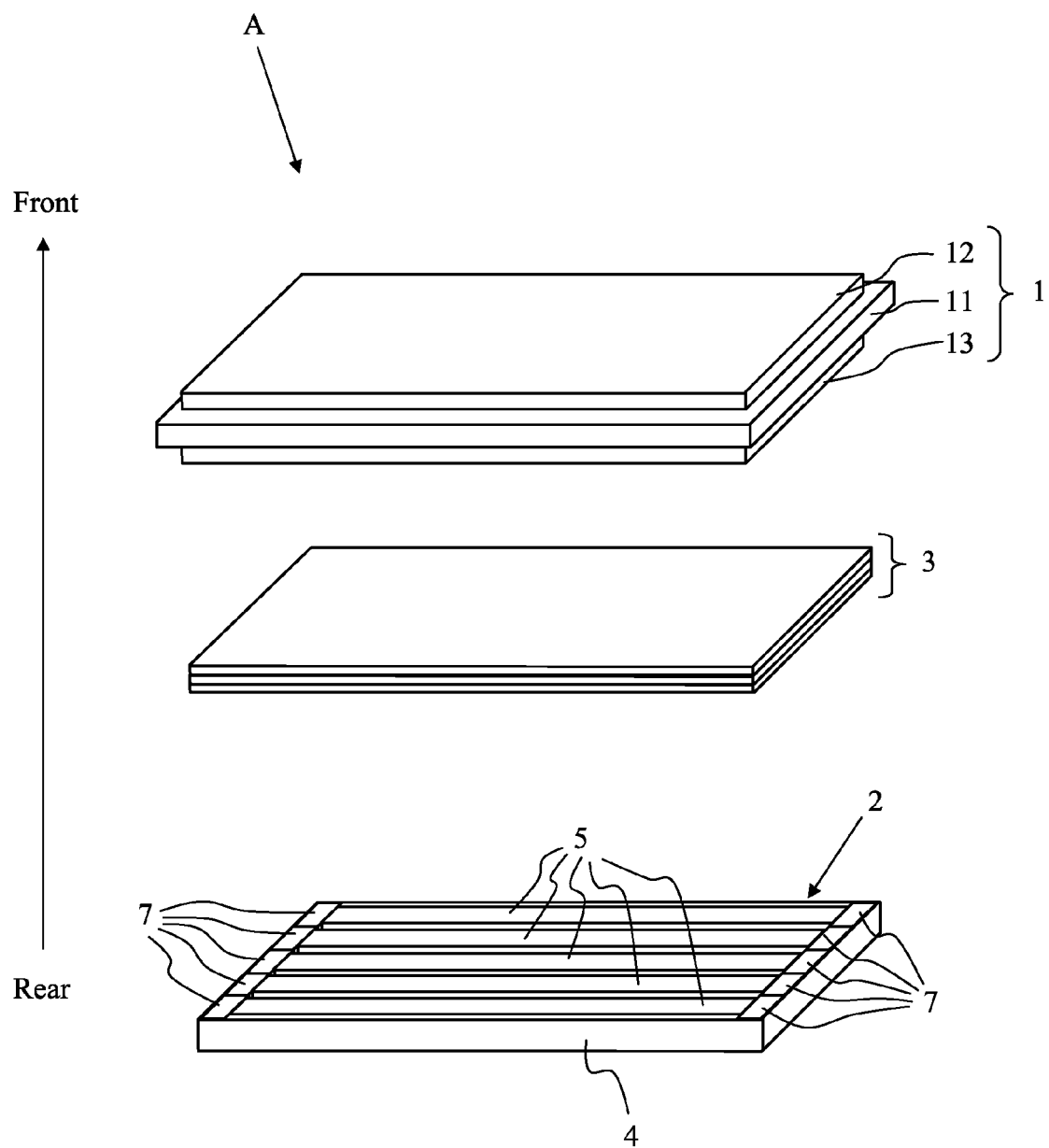
FIG. 1 is an exploded perspective view of an example of a liquid crystal display device that includes a backlight unit according to the present invention.

Hereinafter, embodiments of the present invention are described with reference to the drawings. FIG. 1 is an exploded perspective view of an example of a liquid crystal display device that includes a backlight unit according to the present invention. As shown in FIG. 1, a liquid crystal display device A includes: a liquid crystal display panel 1; and a backlight unit 2 that is disposed on a rear surface of the liquid crystal display panel 1.

The liquid crystal display panel 1 has: a liquid crystal panel 11 in which liquid crystal is injected; a light polarization plate 12 that is attached to a front surface (observer side) of the liquid crystal panel 11; and a light polarization plate 13 that is attached to a rear surface (backlight unit 2 side) of the liquid crystal panel 11. The liquid crystal panel 11 includes: an array board that includes switching devices such as a TFT (thin film transistor) and the like; an opposite board that is disposed to oppose the array board and is provided with a color filter; and liquid crystal that is injected between the array board and the opposite board (none of them are shown). Here, the liquid crystal panel 1 may have a structure in which the color filter is formed on the array board and a transparent electrode is formed on the opposite board.

As shown in FIG. 1, in the liquid crystal display device A, an optical sheet unit 3 is disposed between the liquid crystal display panel 1 and the backlight unit 2. In the liquid crystal display device A shown in FIG. 1, the optical sheet unit 3 includes three optical sheets, which however is not limiting, and may include more sheets, or may be composed of less sheets. The optical sheet unit 3 includes, for example, a diffusion sheet, a lens sheet and the like. The diffusion sheet diffuses input light inside. In other words, the light entering the diffusion sheet is diffused in the diffusion sheet and is output as planar light that has less brightness unevenness. The lens sheet is a sheet that deflects (collects light) a light radiation characteristic; entering light is collected, whereby light emission brightness per unit area improves. Here, there is a case where an optical sheet other than these is used.

The light output from the backlight unit 2 enters the optical sheet unit 3. The light entering the optical sheet unit 3 is diffused and collected, whereby the brightness unevenness is reduced, the light emission brightness is raised, and the light enters the liquid crystal display panel 1.

Figure 2:
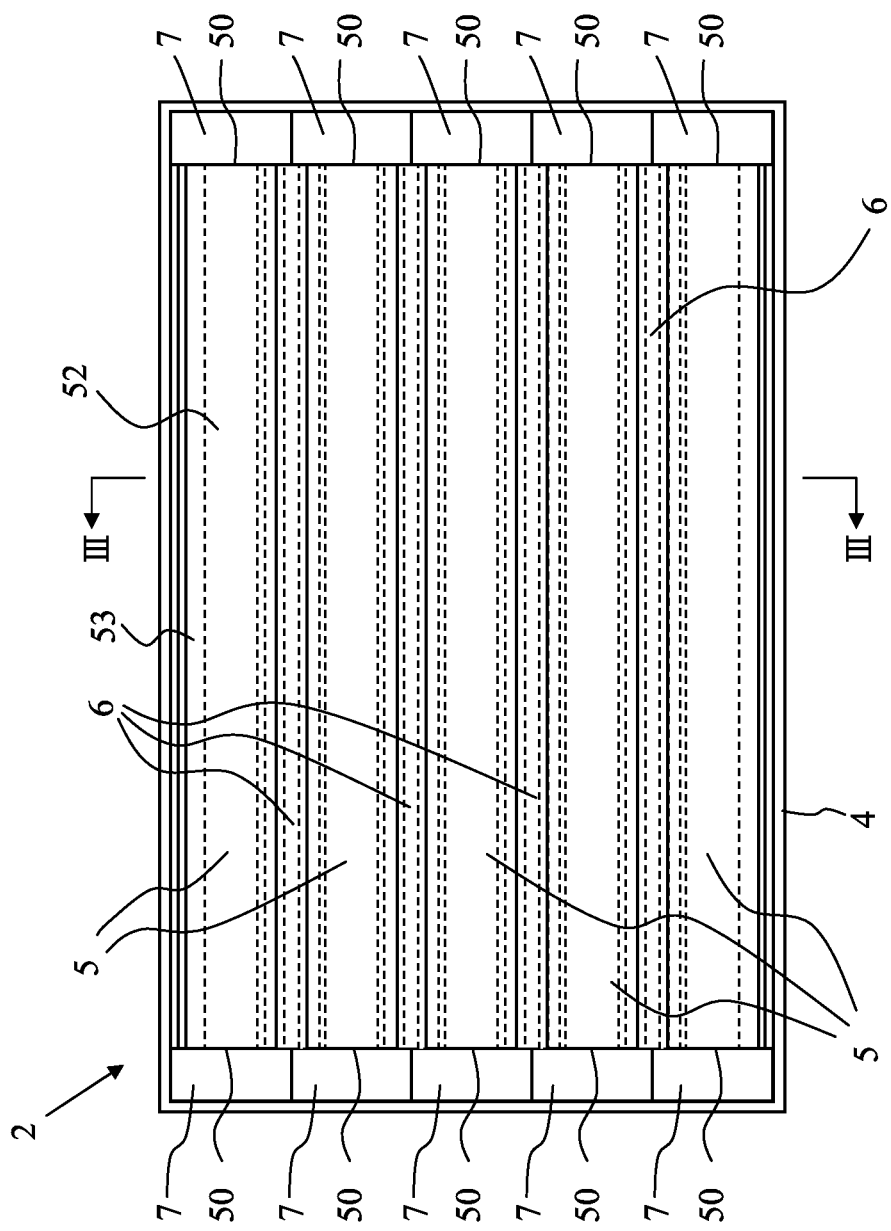
FIG. 2 is a view of an example of a backlight unit according to the present invention when viewed from front.
Figure 3:
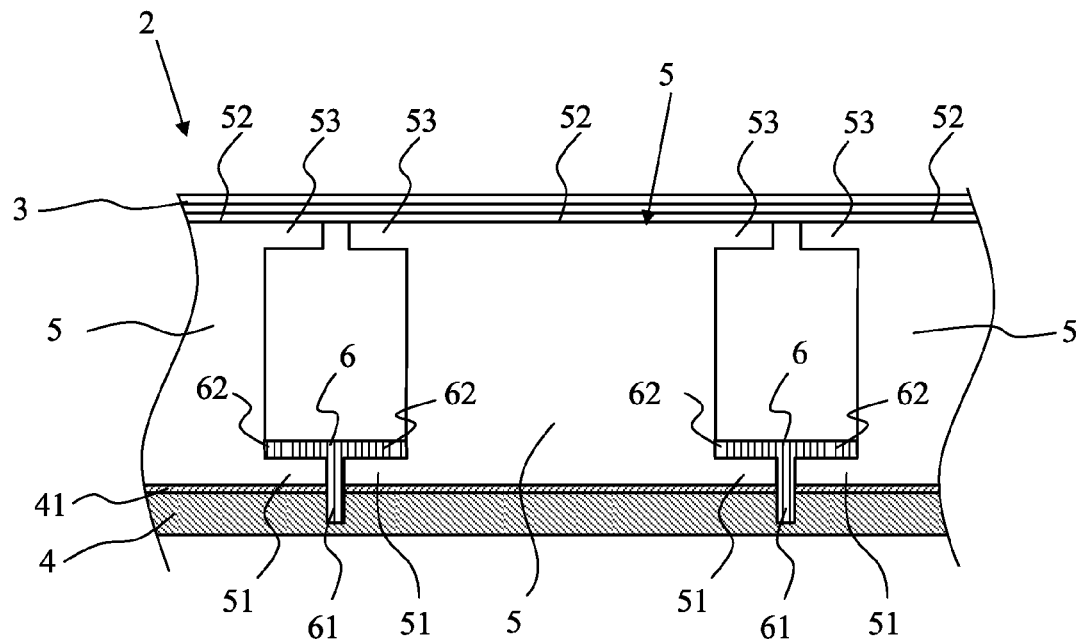
FIG. 3 is a sectional view of the backlight unit shown in FIG. 2 taken along a III-III line.

Details of the backlight unit 2 are described with reference to drawings. FIG. 2 is a view of an example of the backlight unit according to the present invention when viewed from front, and FIG. 3 is a sectional view of the backlight unit shown in FIG. 2 taken along a III-III line. The backlight unit 2 is a backlight unit of edge-light type, and includes: a backlight chassis 4 that is a chassis; a plurality of light guide plates 5 that are ranged in the backlight chassis 4; and a plurality of LED lamps 7 that are light sources which are disposed near to one another on a side surface (in the present embodiment, both of left and right sides) in a long-edge direction of the light guide plate 5 and output light to the light guide plate 5. A reflection sheet 41, which reflects and returns light leaking from a rear side of the light guide plate 5 back to the light guide plate 5, is disposed between the light guide plate 5 and the backlight chassis 4.

The light guide plate 5 is an elongated member that is made of a material (e.g., a transparent resin) that transmits light. The light guide plates 5 are disposed in the backlight chassis 4 adjacently to one another in a short-edge direction, fixed by means of a fixing clip 6 that is a fixing member, and have a rectangular shape when viewed from front. Both end surfaces in the long-edge direction (left-right direction in the figure) of each of the light guide plates 5 define a light reception portion 50, and the LED lamp 7 is disposed to oppose the light reception portion 50. Here, in the backlight unit 2, the LED lamp 7 is disposed by one near to each of both left and right end portions of the light guide plate 5; however, may be disposed at either one end portion only, or may be disposed at a left or right end portion (alternately) of each of the adjacent light guide plates 5. Besides, the LED lamp 7 may include one LED device, or a plurality of LED devices (e.g., LED devices that emit light of R, G, and B wavelengths, respectively) may be ranged into the LED lamp as a whole.

The light guide plate 5 and the fixing clip 6 are described. As shown in FIG. 3, the light guide plate 5 is disposed on a side (rear side) that comes into contact with the backlight chassis 4, and includes: a fixing convex portion 51 that protrudes in the short-edge direction; and an output portion 52 that is disposed on a side (front side) opposite to the backlight chassis 4 and outputs the light received by the light reception portion 50 to the liquid crystal display panel 1. The output portion 52 includes an extension portion 53 that extends toward (in the short-edge direction) the adjacent light guide plates 5.

The light guide plate 5 is ranged in the short-edge direction of the backlight chassis 4. The reflection sheet 41 is disposed between the light guide plate 5 and the backlight chassis 4, and together with the reflection sheet 41, the light guide plate 5 is fixed to the backlight chassis 4 by means of the fixing clip 6. As shown in FIG. 3, the fixing clip 6 is a member that has a T shape in section, and includes: an engagement portion 61 that engages with the backlight chassis 4; and a push portion 62 that pushes the fixing convex portion 51. The fixing clip 6 pushes the fixing convex portions 51 of the adjacent light guide plates 5, thereby fixing the light guide plates 5 to the backlight chassis 4.

In the light guide plate 5, when light hits a surface at a predetermined incident angle (total reflection angle) or more, the light is totally reflected at the surface. According to this, in the light guide plate 5, the light repeats reflection at the surfaces and spreads into the light guide plate 5. The LED lamp 7 is disposed on the backlight chassis 4 to output the light to the light reception portion 50 at an angle such that the light is totally reflected at the surface of the light guide plate 5.

On the other hand, a portion of (or all of) light entering the light guide plate 5 at an angle smaller than the predetermined incident angle is output to outside from the surface of the light guide plate 5. The light guide plate 5 is provided with a reflection dot (not shown) that is made by printing or resin forming on a surface (surface on which the fixing convex portion 51 is formed) that opposes the output portion 52 such that the light reflected inside is output from the output portion 52. According to this, the light traveling in the light guide plate 5 is reflected by the reflection dot and enters the output portion 52 at an angle smaller than the total reflection angle. The light repeating the reflection in the light guide plate 5 is reflected by the reflection dot, whereby a portion or all of the light is output from the output portion 52 to the outside of the light guide plate 5. By suitably disposing the reflection dot, it is possible to approximate the brightness of the light output from the output portion 52 to an even brightness in a plane.

As shown in FIG. 3, the light guide plate 5 is disposed such that adjacent extension portions 53 come close to each other. The light is output from the extension portion 53 as well of the output portion 52. The light output from the output portion 52 spreads to a gap between the extension portions 53, accordingly, brightness decline at the gap is alleviated. Further, the light output from the output portion 52 of each light guide plate 5 is diffused and collected by the optical sheet unit 3. According to this, the light easily spreads into the gap portion between the extension portions 53, whereby the brightness decline at the gap is further alleviated. As a result of this, the light output from the backlight unit 2 is output to the liquid crystal display panel 1 as the planar light that has less brightness unevenness. Here, the reflection dot may be formed on a surface of the extension portion 53 that opposes the backlight chassis 4.

Here, to more even the light output from the output portion 52, it is better if the gap between the adjacent extension portions 53 is smaller (or the adjacent extension portions 53 are in contact with each other). Here, from the viewpoint of easy assembly, it is preferable that the light guide plate 5 is structured to include the output portion 52 (the extension portion 53) where a gap is formed within the extent that the light output from the backlight unit 2 does not cause image unevenness when displaying an image on the liquid crystal display panel 1.

Besides, the method for fixing the light guide plate 5 by means of the fixing clip 6 is not especially decided. For example, the fixing clip 6 is inserted between the extension portion 53 and the fixing convex portion 51 along the long-edge direction from either one end portion of the light guide plate 5 in the long-edge direction (left-right direction in FIG. 2). Thereafter, a bar-shaped tool is inserted between the extension portion 53 and the fixing convex portion 51 in the same way to push the fixing clip 6 against the backlight chassis 4 and fix the light guide plate 5 by means of the fixing clip 6, which is another fixing method. Besides, in a case where the push portion 62 of the fixing clip 6 is elastically deformable and there is a gap between the extension portions 53, the push portion 62 of the fixing clip 6 may be deformed and moved in the gap between the extension portions 53; thereafter, the engagement portion 61 may be inserted into the gap between the fixing convex portions 51 to fix the light guide plate 5.

As described above, the backlight unit 2 has the structure in which the plurality of light guide plates 5 are combined, accordingly, it is possible to perform area control that controls the brightness of the planar light output from the backlight unit 2 to obtain a different brightness for every different area. And, the extension portions 53 of the adjacent light guide plates 5 are near to each other, accordingly, even in a case where all the light guide plates 5 output the light which has the same brightness, the light output from the extension portion 53 of the output portion 52 easily spreads into the gap between the extension portions 53, whereby the brightness unevenness is unlikely to occur. According to this, it is possible to raise the image display quality of the liquid crystal display device.

Besides, during the production process of the backlight unit 2, the processes such as bonding or welding of the light guide plate 5 and the like, which easily cause the working unevenness depending on the skills of the worker and the working environment, are unnecessary, accordingly, unevenness in performance of the backlight unit 2 is unlikely to occur.

Figure 4:
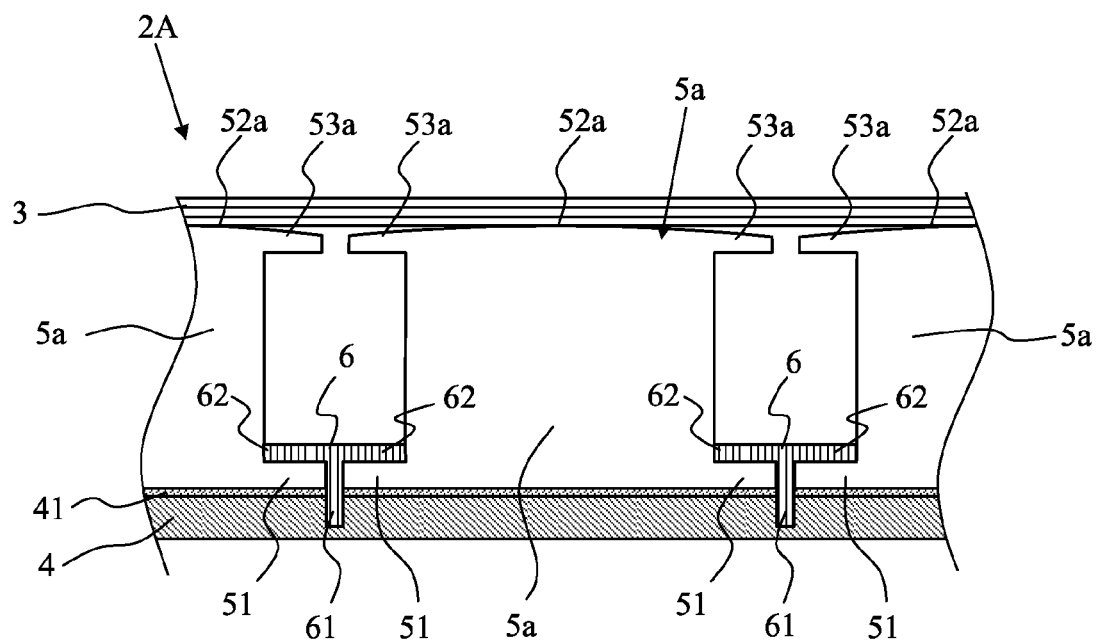
FIG. 4 is a sectional view of another example of a backlight unit according to the present invention.

Another example of the backlight unit according to the present invention is described with reference to a drawing. FIG. 4 is a sectional view of another example of the backlight unit according to the present invention. Like FIG. 3, FIG. 4 is a sectional view of the backlight unit taken along the short-edge direction. The backlight unit 2A shown in FIG. 4 has the same shape and structure as the backlight unit 2 except that the shape of an output portion 52a of a light guide plate 5a is different; the substantially same portions are indicated by the same reference numbers, and detailed description of the same portions is skipped.

As shown in FIG. 4, in the light guide plate 5a, the output portion 52a has a convex curved surface shape. The curved surface of the output portion 52a is a shape bent in the short-edge direction. As described above, the output portion 52a is formed of the convex curved surface, whereby it is possible to output the light from the output portion 52a in the short-edge direction of the light guide plate 5a at a wide angle. According to this, even in a case where it is impossible to sufficiently narrow the gap between the adjacent output portions 52a (extension portions 53a), the light from the extension portion 53a of the output portion 52a is easily output into the gap, accordingly, it is possible to alleviate the brightness decline at the gap and the occurrence of the brightness unevenness.

Figure 5:
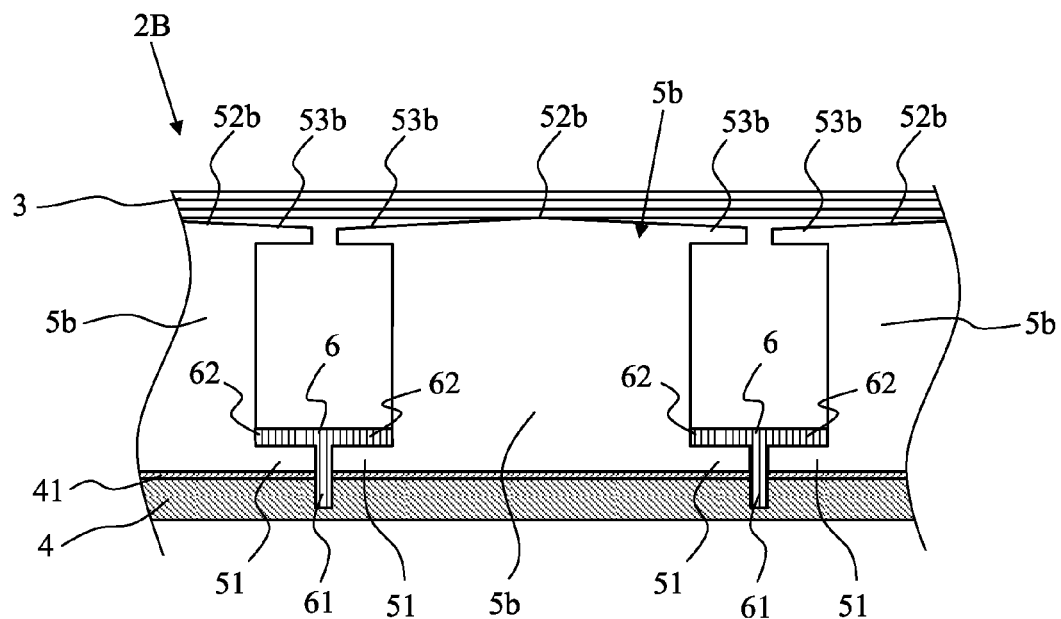
FIG. 5 is a sectional view of still another example of a backlight unit according to the present invention.

Still another example of the backlight unit according to the present invention is described with reference to a drawing. FIG. 5 is a sectional view of still another example of the backlight unit according to the present invention. Like FIG. 3, FIG. 5 is a sectional view of the backlight unit taken along the short-edge direction. The backlight unit 2B shown in FIG. 5 has the same shape and structure as the backlight unit 2 except that the shape of an output portion 52b of a light guide plate 5b is different; the substantially same portions are indicated by the same reference numbers, and detailed description of the same portions is skipped.

As shown in FIG. 5, the light guide plate 5b has the output portion 52b which has a shape obtained by combining two planes such that a ridge line extending in the long-edge direction is formed at a center in the short-edge direction. According to the output portion 52b obtained by combining the two planes as described above, it is possible to output the light output from the output portion 52b in the short-edge direction at a wide angle. According to this, even in a case where it is impossible to sufficiently narrow the gap between the adjacent output portions 52b (extension portions 53b), the light from the extension portion 53b of the output portion 52b is easily output into the gap, accordingly, it is possible to alleviate the brightness decline at the gap and the occurrence of the brightness unevenness.

Here, in the present example, the example is described, in which the output portion 52b forms the ridge line by connecting the two planes that are inclined at angles different from each other; however, this is not limiting, and the angle of the plane may be suitably adjusted in accordance with a disposition place and a length to the output portion of the adjacent light guide plates. In a case of a shape where the two planes of the output portion 52b become symmetrical with respect to the ridge line, universality improves. Besides, a shape may be employed, in which two or more planes having inclined angles different from one another are connected to one another. Besides, the connection portion between the planes may be formed into a curved surface. Further, a shape may be employed, in which all of a plurality of divided regions are not a plane, but part of them are a curved surface.

Figure 6:
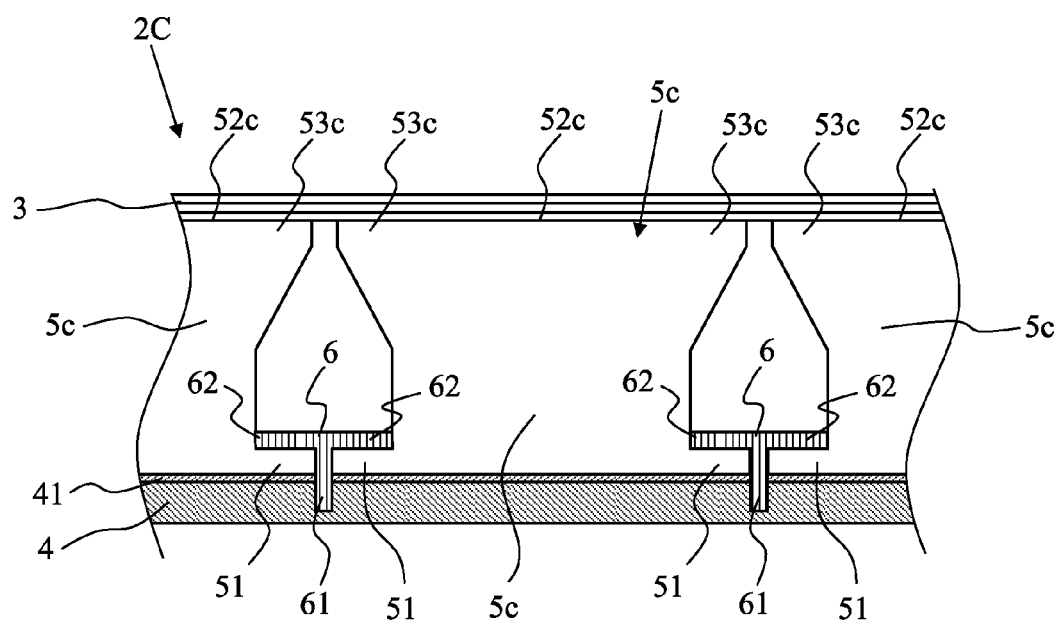
FIG. 6 is a sectional view of still another example of a backlight unit according to the present invention.
Figure 7:
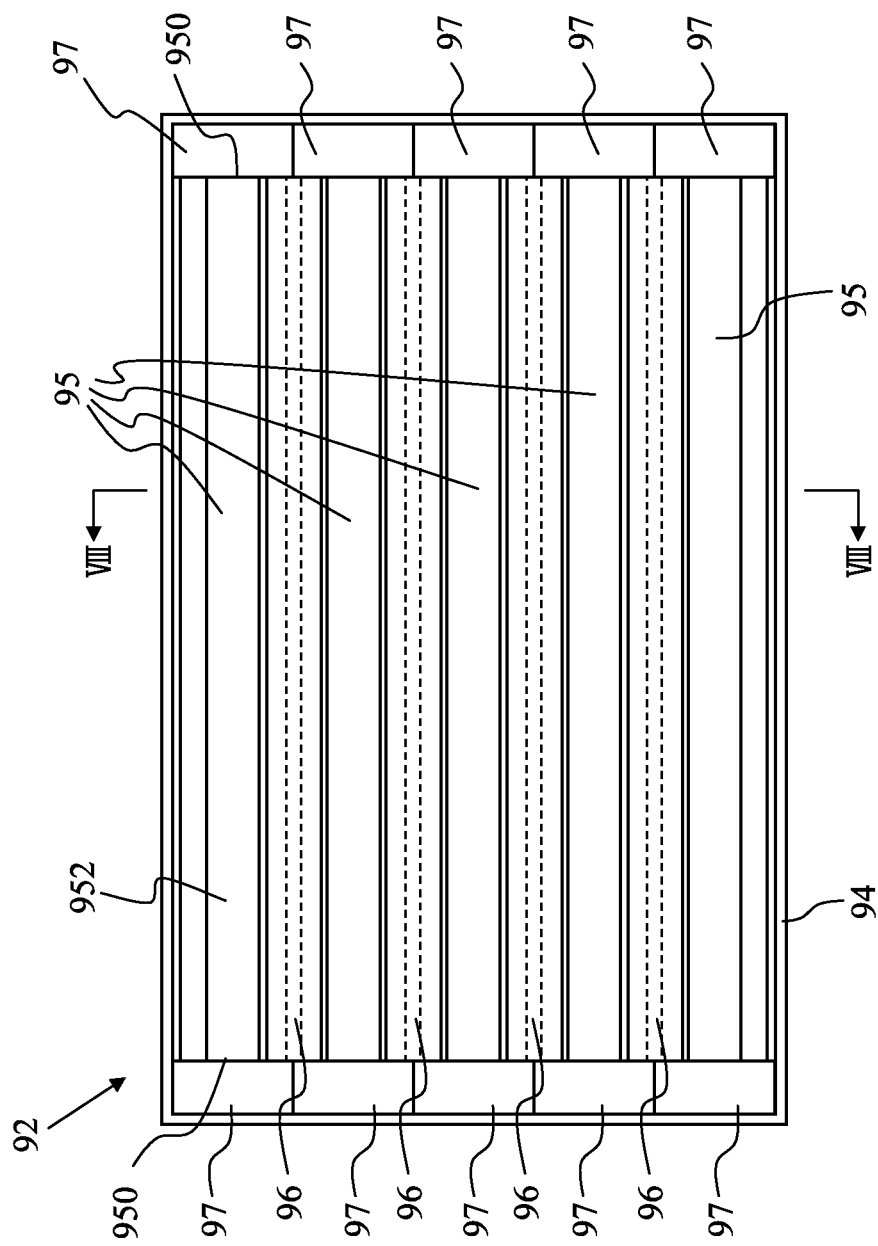
FIG. 7 is a front view of a conventional backlight unit that is used for a liquid crystal display device.
Figure 8:
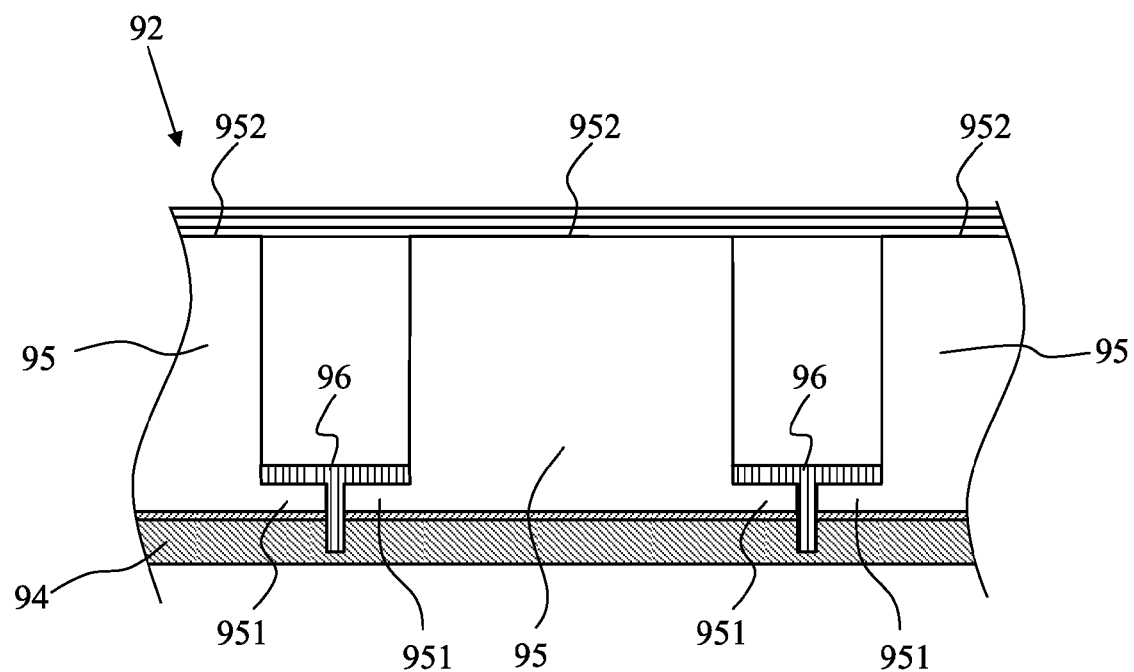
FIG. 8 is a sectional view of the backlight unit shown in FIG. 7 taken along a VIII-VIII line.

Still another example of the backlight unit according to the present invention is described with reference to a drawing. FIG. 6 is a sectional view of still another example of the backlight unit according to the present invention. Like FIG. 3, FIG. 6 is a sectional view of the backlight unit taken along the short-edge direction. The backlight unit 2C shown in FIG. 6 has the same shape and structure as the backlight unit 2 except that the shape of an output portion 52c of a light guide plate 5c is different; the substantially same portions are indicated by the same reference numbers, and detailed description of the same portions is skipped.

In the light guide plate 5c shown in FIG. 6, the shape of an extension portion 53c of the output portion 52c opposing the backlight chassis 4 becomes wider as a point of the extension portion goes away from the backlight chassis 4, which is a so-called wedge-like shape. As described above, the extension portion 53c has the wedge-like shape, accordingly, the amount of the light traveling to the extension portion 53c via the wedge-shaped portion increases. According to this, it is possible to raise the brightness of the light output from the extension portion 53c of the output portion 52c, and it is possible to alleviate the brightness decline at the gap between the adjacent output portions 52c (extension portions 53c) and the occurrence of the brightness unevenness. Here, an end portion of the wedge shape of the extension portion near to the backlight chassis 4 extends to a nearly central portion of the light guide plate 5c; however, this is not limiting. For example, if it is possible to firmly fix the fixing convex portion 51 by means of the fixing clip 6, a shape may be employed, in which the fixing convex portion 51 and the wedge shape of the extension portion 53c connect to each other.

In the backlight units described above, the example is described, which at the output portion of the light guide plate, includes the optical sheet unit 3 that covers the light guide plate; however, this is not limiting, and the optical sheet unit may be mounted to come into tight contact with the output portion of the light guide plate when producing the backlight unit. Here, a structure may be employed, which uses a light guide plate in which the output portion has the same function as the diffusion sheet that diffuses the light, or a structure may be employed, in which the output portion outputs only the light and which includes a diffusion plate in the optical sheet unit that diffuses the light. Here, in the above light guide plate, the output portion is provided with the function to diffuse the light. As a member that has the function to diffuse the light, for example, there is a member that includes innumerable minuscule concaves and convexes on a surface.

In each embodiment described above, the example is described, in which as the display device that uses the backlight unit, the liquid crystal display device is described; however, this is not limiting, and it is possible to use the backlight unit as a rear surface illumination device for a display device that uses a transmissive type or a semi-transmissive type of display panel which is able to display an image by outputting the light from a rear side. Besides, the example is described, in which the light guide plate disposed in the above backlight unit is an elongated member and is ranged in the short-edge direction; however, this is not limiting.

INDUSTRIAL APPLICABILITY

The present invention is applicable to a liquid crystal display device that is used for devices such as a flat-screen television device, a flat-screen display device, a mobile phone and the like, and to a backlight unit of the liquid crystal display device.

REFERENCE SIGNS LIST 1 liquid crystal display panel
2 backlight unit
3 optical sheet unit
4 backlight chassis
41 reflection sheet
5 light guide plate
50 light reception portion
51 fixing convex portion
52 output portion
53 extension portion
6 fixing clip
61 engagement portion
62 push portion
7 LED lamp

The invention claimed is:

1. A backlight unit comprising:
a chassis;
a plurality of light guide plates that are arranged in the chassis; and
a fixing member that fixes adjacent ones of the light guide plates to the chassis; wherein
the light guide plate includes: an output portion that is formed on a front side and outputs planar light; and a fixing convex portion that is formed on a side opposite to the output portion, protrudes toward the adjacent light guide plates and is pushed by the fixing member; and
the output portion includes an extension portion that extends to cover at least a portion of the fixing convex portion when viewed from front.

2. The backlight unit according to claim 1, wherein
the extension portion is formed not to come into contact with the extension portions of the adjacent light guide plates when the plurality of light guide plates are ranged in the chassis.

3. The backlight unit according to claim 1, wherein
a portion of the output portion that outputs the planar light is formed of a convex curved surface.

4. The backlight unit according to claim 2, wherein
a portion of the output portion that outputs the planar light is formed of a convex curved surface.

5. The backlight unit according to claim 1, wherein
a portion of the output portion that outputs the planar light has a shape including a ridge line which connects two or more planes to each other and extends in a direction to intersect a ranged direction of the light guide plate.

6. The backlight unit according to claim 2, wherein
a portion of the output portion that outputs the planar light has a shape including a ridge line which connects two or more planes to each other and extends in a direction to intersect a ranged direction of the light guide plate.

7. The backlight unit according to claim 1, wherein
the extension portions of the adjacent light guide plates are formed to come into contact with each other when the plurality of light guide plates are ranged in the chassis.

8. The backlight unit according to claim 1, wherein
in each of the light guide plate, optical members that diffuse light are independently provided on the output portion.

9. The backlight unit according to claim 2, wherein
in each of the light guide plate, optical members that diffuse light are independently provided on the output portion.

10. The backlight unit according to claim 1, wherein
the extension portion is formed to gradually spread toward a surface from which the planar light exits.

11. The backlight unit according to claim 2, wherein
the extension portion is formed to gradually spread toward a surface from which the planar light exits.

12. The backlight unit according to claim 3, wherein
the extension portion is formed to gradually spread toward a surface from which the planar light exits.

13. The backlight unit according to claim 7, wherein
the extension portion is formed to gradually spread toward a surface from which the planar light exits.

14. A liquid crystal display device that uses a backlight unit according claim 1 as an illumination device.

15. A liquid crystal display device that uses a backlight unit according to claim 2 as an illumination device.

16. A liquid crystal display device that uses a backlight unit according to claim 3 as an illumination device.

17. A liquid crystal display device that uses a backlight unit according to claim 5 as an illumination device.

18. A liquid crystal display device that uses a backlight unit according to claim 7 as an illumination device.

19. A liquid crystal display device that uses a backlight unit according to claim 8 as an illumination device.

20. A liquid crystal display device that uses a backlight unit according to claim 10 as an illumination device.

* * * * *